United States Patent [19]

Gillery

[11] Patent Number: 4,940,884
[45] Date of Patent: * Jul. 10, 1990

[54] DUAL BUS BAR ARRANGEMENT FOR AN ELECTRICALLY HEATABLE TRANSPARENCY

[75] Inventor: Frank H. Gillery, Hampton Township, Allegheny County, Pa.

[73] Assignee: PPG Industries, Inc., Pittsburgh, Pa.

[ * ] Notice: The portion of the term of this patent subsequent to Apr. 11, 2006 has been disclaimed.

[21] Appl. No.: 286,016

[22] Filed: Dec. 19, 1988

Related U.S. Application Data

[63] Continuation-in-part of Ser. No. 138,008, Dec. 28, 1987, Pat. No. 4,820,902.

[51] Int. Cl.$^5$ .......................... H05B 3/84; H05B 3/26; E06B 7/12; B60J 1/20
[52] U.S. Cl. ....................................... 219/203; 52/171; 219/345; 219/522; 219/543; 219/547; 338/309
[58] Field of Search ............... 219/203, 522, 547, 543, 219/345; 338/308, 309; 52/171

[56] References Cited

U.S. PATENT DOCUMENTS

| | | | |
|---|---|---|---|
| 3,379,859 | 4/1968 | Marriott | 219/543 X |
| 3,781,524 | 12/1973 | Levin | 338/309 |
| 3,794,809 | 2/1974 | Beck et al. | 219/203 |
| 3,876,862 | 4/1975 | Newman et al. | 219/543 X |
| 3,892,947 | 7/1975 | Strengholt | 219/203 X |
| 3,895,213 | 7/1975 | Levin | 219/203 |
| 4,100,398 | 7/1978 | Levin | 219/543 X |
| 4,323,726 | 4/1982 | Criss et al. | 219/203 X |
| 4,543,466 | 9/1985 | Ramus | 219/203 |
| 4,668,270 | 5/1987 | Ramus | 219/203 X |
| 4,820,902 | 4/1989 | Gillery | 219/547 X |
| 4,847,472 | 7/1989 | Koontz | 219/203 X |

Primary Examiner—Anthony Bartis
Attorney, Agent, or Firm—Dennis G. Millman

[57] ABSTRACT

A heated transparency is provided with greater reliability by providing dual electrical connections to the bus bar that is at the edge portion remote from the edge at which attachment to the power source are made.

17 Claims, 2 Drawing Sheets

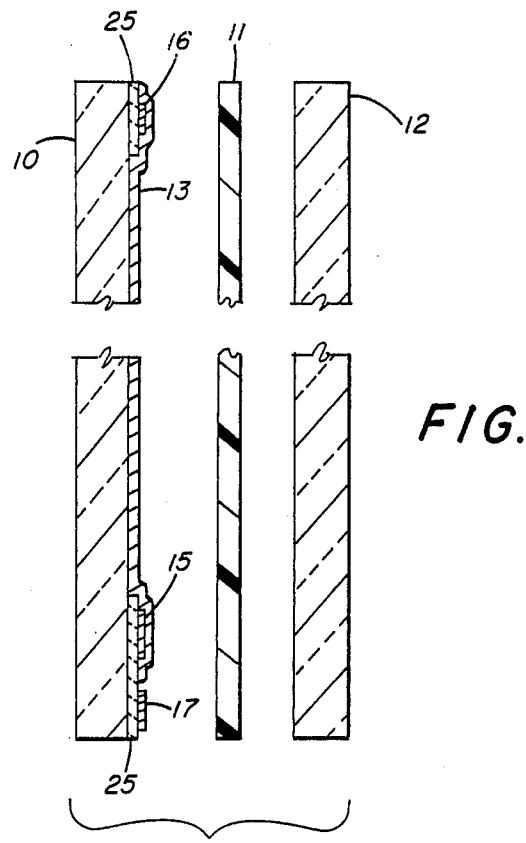
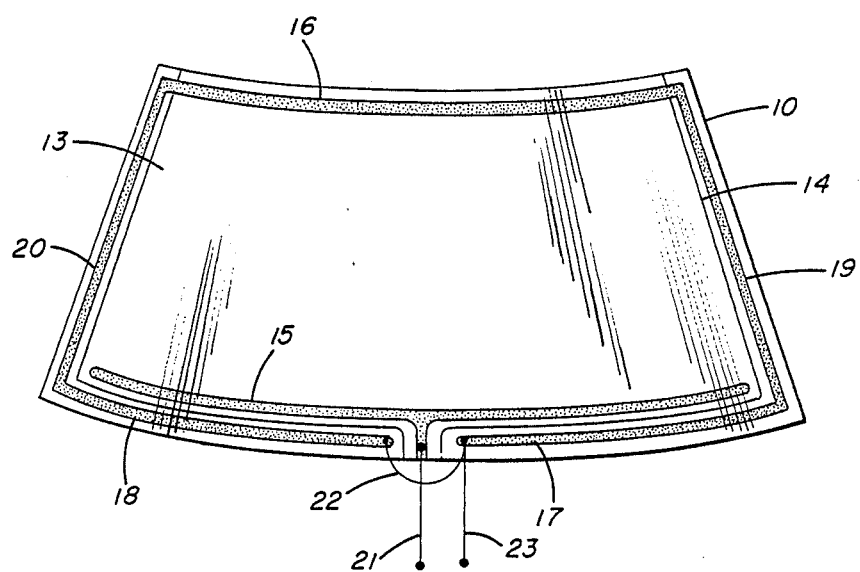

DUAL BUS BAR ARRANGEMENT FOR AN ELECTRICALLY HEATABLE TRANSPARENCY

CROSS-REFERENCE TO RELATED APPLICATION

This application is a continuation-in-part of U.S. patent application Ser. No. 138,008 filed on Dec. 28, 1987 now U.S. Pat. No. 4,820,902.

BACKGROUND OF THE INVENTION

This invention relates to an improvement in an electrically heated transparency such as may be employed in a vehicle to provide defrosting, deicing, or defogging capability. In particular, the improvement is in the bus bar arrangement and is intended to provide more reliable performance of the heating means.

It has been know to pass electric current through a transparent conductive coating on a transparency in order to raise the temperature of the transparency. Generally, a source of electrical potential is connected to the conductive coating by way of a pair of bus bars along opposite sides of the area of the transparency to be heated. The bus bars have low resistivity relative to the coating and are intended to distribute the current evenly over the area to be heated. The bus bars may be comprised of metallic foil strips, but in the case of glass transparencies they preferably are comprised of a metallic-ceramic frit material fused onto a surface of the transparency. A typical arrangement includes bus bars configured as substantially parallel stripes on opposite sides of the heated area, with electrical leads attached to each bus bar and extending away from the opposite edges of the transparency as shown in U.S. Pat. Nos. 4,323,726 (Criss et al.) and 4,668,270 (Ramus). Locating the leads on the same side of the transparency and preferably closely adjacent to each other is advantageous for the sake of easier installation of the transparency in the vehicle and simplifying the connection with the electrical power source. Therefore, U.S. Pat. No. 3,895,213 (Levin) and U.S. Pat. No. 4,543,466 (Ramus) provide an extension of one of the bus bars around an end of the transparency so that connections to both bus bars can be made in one relatively compact area.

Several modes of failure of heated transparencies can involve the bus bars. An imperfection in or damage to a bus bar such as a thin area or crack results in a concentrated flow of current through that area which in turn causes overheating. A gap in the circuit can cause arcing. Overheating or arcing can damage the plastic innerlayer in a laminated transparency, or even damage the glass in severe cases. Excessive localized heat in a bus bar can also exacerbate the defect, leading to a breach in the circuit and possible inoperativeness. A complete break in a bus bar would, of course, severely impare or render inoperative the heating circuit. Heated transparencies are even more vulnerable to bus bar problems in those cases such as in the aforesaid U.S. Pat. Nos. 3,895,213 and 4,543,466 where an extension of one of the bus bars extends around a third side of the transparency to provide adjacent terminal locations. Not only is there a greater length of bus bar subject to failure in such a case, but also failure in the extension portion is particularly critical since it carries a heavy power load and its malfunction renders the entire system inoperative.

SUMMARY OF THE INVENTION

The invention relates to heated transparencies in which it is desired to locate the electrical terminals along the same edge of the transparency or closely adjacent to each other. In general, one bus bar is close to the terminal location and the other bus bar is remote from the terminal location whereby the connection to one bus bar is required to be longer than that to the other bus bar. In the present invention, connection of the remote bus bar to electrical circuit is made by way of two separate conductive extensions of the bus bar, each extending from opposite ends of the remote bus bar to the terminal area. The conductive extensions are insulated from the conductive coating on the transparency, preferably by omitting or deleting the coating in the marginal area near the extensions. By providing a second, redundant connection to the remote bus bar, each conductive extension carries only half of the current. Therefore, as compared to prior art arrangements that use a single connection, only one fourth as much heat per unit area or bus bar is generated due to the resistance of the extensions, and the total power loss is halved. If a thin spot or partial break is present in one of the extensions, undue heating at that spot will not occur because the presence of the other extension prevents the total resistance from increasing detrimentally. If one of the bus bar extensions fails, the availability of the other extension can carry the full load and prevent failure of the heating system.

Another advantage is that the dual connections to the remote bus bar yield a more uniform heating pattern in the transparency. When a single connection is made to one end of a bus bar, the resistance of the bus bar itself biases more current to enter that area of the bus bar. The result is a higher power output in the region near the connection and an uneven heating pattern. When two connections are made to a bus bar, however, the effect of concentrating the current and the power near the connections is cut in half because it is distributed over two sites. Thus, there is less of a difference in the heating rates between the corners and the center of the transparency.

The advantages of this invention are particularly significant in a large area, low voltage system where total power is high and current is then necessarily large. Such a condition would be typical in a heated automobile windshield, although the invention is not limited to such.

THE DRAWINGS

FIG. 1 is a exploded, cross-sectional, enlarged view of a typical laminated windshield construction in which the present invention may be incorporated.

FIG. 2 is a schematic, elevational view of a windshield incorporating an embodiment of the bus bar arrangement to which the parent application is directed.

DETAILED DESCRIPTION

Figure 3:
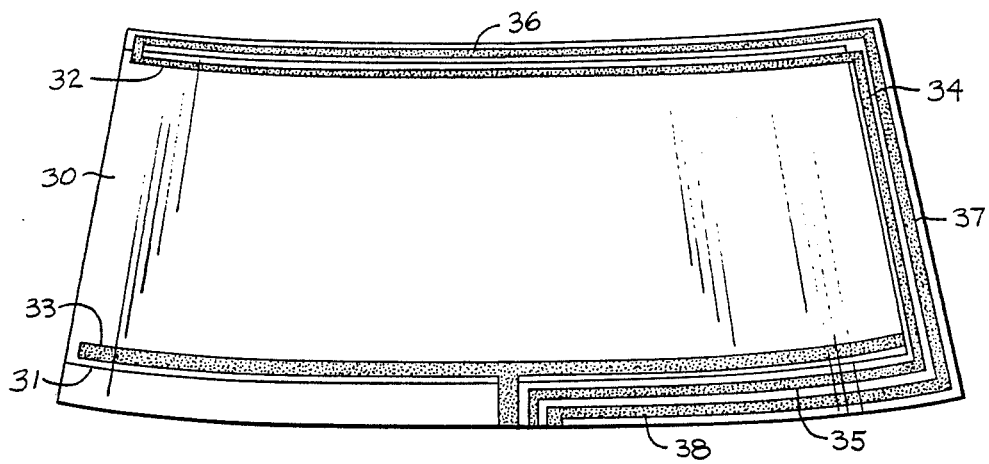
FIG. 3 is a schematic, elevational view of a windshield incorporating a variation of the dual bus bar concept to which the present invention is directed.

The description of the preferred embodiments herein is in reference to a laminated transparency comprised of two plies of glass bonded together by an interlayer of plastic since that is the typical windshield construction.

But it should be understood that the invention can apply to heated transparencies involving a single ply of glass with a single ply of plastic, all plastic laminations, and other combinations involving numerous plies. The transparency need not be intended for use as an automobile windshield, but may be any window for a vehicle or other enclosure, including aircraft.

In the example shown in FIG. 1, the transparency is comprised of an outboard glass sheet 10, a plastic interlayer 11 which may be polyvinylbutyral as is commonly used for laminated windshields or other suitable interlayer material, and an inboard sheet of glass 12. An electroconductive coating 13 is preferably placed on a surface that is not exposed, most preferably on the inboard side of the outboard glass sheet 10. Various coatings may exhibit the combination of transparency and electroconductivity to serve as the heating element for the transparency, but a preferred coating is that disclosed in U.S. Pat. No. 4,610,771 (Gillery), the disclosure of which is hereby incorporated by reference. That coating comprises a film of silver between films of zinc stannate, each of which may be applied sequentially by magnetron sputtering. The silver acts as the conductive layer and the zinc stannate films serve to mask the reflectance of the silver. The coating exhibits appropriate resistivity for use as a heated windshield when the silver layer has a thickness of about 110 angstroms, for example.

An optical feature shown in FIG. 1 but omitted from FIG. 2 for the sake of clarity is an opaque border 25 which may be ceramic enamel applied to the flat glass surface by silk screening and fired on during the heating of the sheet for bending. The opaque border 25 serves to conceal attachment means and other elements when installed in a vehicle, and may also conceal the bus bars of the heating circuit.

Referring now to FIGS. 1 and 2, the electrical connections to the heated windshield embodiment shown are at the lower edge, at the center portion thereof. It should be understood that the connections could be at any edge or at an off-center location such as a corner region. The connections could even be on different edges. A bottom bus bar 15 and top bus bar 16 are in contact with the coating 13. Line 14 indicates an edge of the coating 13 spaced from the sides and bottom edges of the transparency, leaving an uncoated margin along three sides thereof. The uncoated marginal areas may be created by masking those areas during the coating process. Optionally the entire sheet could be coated and the coating subsequently deleted from those areas. The uncoated marginal areas permit connections to be made to the upper bus bar 16 without contact with the coating 13. As shown in FIG. 2, the connections to the upper bus bar include two conductive strips 17 and 18 extending in opposite directions along the bottom edge of the transparency from the terminal area, and side strips 19 and 20 extending along opposite side portions which connect strips 17 and 18 to opposite ends of the upper bus bar 16. The bus bars and the conductive strips may be made of the ceramic frit material containing silver well known in the art and which may be silk screened onto the glass surface (or onto the opaque border 25) and fused by heating. The conductivity of the bus bars and the conductive strips is chosen to be considerably greater than that of the coating 13. Electrical lead 21 connects the lower bus bar to one pole of an electrical power source, and strips 17 and 18 leading to the upper bus bar may be wired in common to the opposite pole by means of a jumper wire 22 and lead 23.

It should be understood that the extensions of the remote bus bar extend along opposite ends of the transparency. In FIG. 3 there is shown a variation in which the bus bar extensions pass around the same end of the transparency. A transparency 30, perferably a laminate as described above, carries a coated area 31 and upper and lower bus bars 32 and 33. The extension from the right end of the upper bus bar 32 as viewed in FIG. 3 is comprised of a side strip 34 and a lateral strip 35 similar to the configuration of FIG. 2. But the extension to the left end of the upper bus bar, rather than providing a symmetrical pattern, comprises an upper lateral strip 36 substantially parallel to the upper bus bar 32, and end strip 37 substantially parallel to the strip 34, and a lower lateral strip 38 substantially parallel to the lower bus bar 33. Both extensions are electrically insulated from the electroconductive coating 31, preferably by deletion of the coating in the marginal areas along which the extensions pass. Because one extension is considerably longer than the other in the FIG. 3 arrangement, compensation for a difference in resistance may be desired to maintain an even distribution of current to both ends of the upper bus bar 32. The longer extension could be made of a lower resistance material, but since it would be preferable for the sake of manufacturing efficiency to apply the bus bars and extensions in a single operation using the same material, it may be preferable to lower the unit length resistance of the longer extension by making it wider than the shorter extension along a substantial portion of its length. Accordingly, strips 37 and 38 may be slightly wider than strips 34 and 37. As in the other embodiments, it should be understood that the terminal area of the FIG. 3 embodiment need not be centrally located along an edge and need not be at the bottom edge. Although it is convenient for the sake of assembling the external electrical connections onto the transparency to locate the connection points of the terminal area closely adjacent to each other, they may be spaced apart along an edge. In that case, the resistance could be at least partially equalized by omitting strip 38 and making the external attachment to the bottom end or some other portion of strip 37. In those cases where the resistance of the bus bar extension strips is very low, either due to a relatively highly conductive composition or relatively large thickness of the strips, it may not be necessary to make compensation for resistance differences. The bus bars and extensions may be partially or wholly concealed by a band of opaque coating (not shown in FIG. 3) applied to the marginal areas of the transparency or by trim members on the vehicle.

Figure 4:
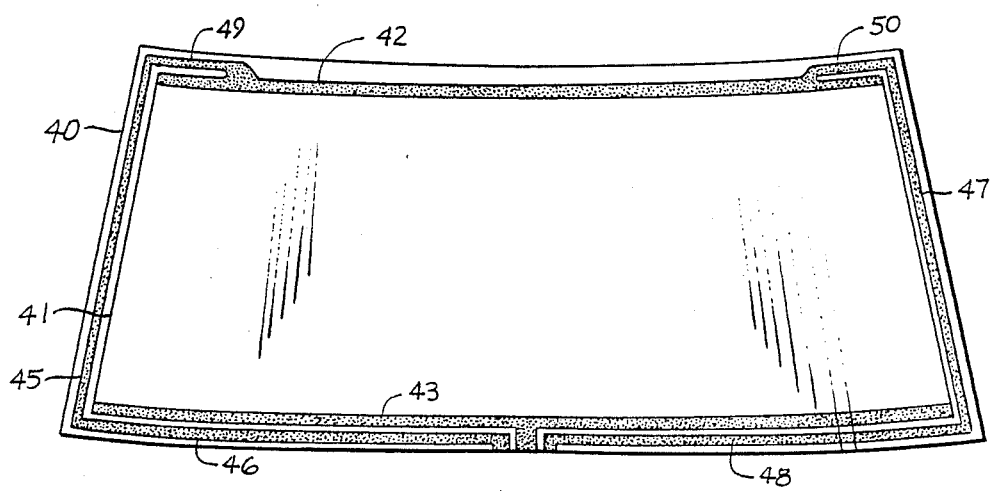
FIG. 4 is a schematic, elevational view of a windshield incorporating another variation of the invention.

The general concept of the present invention is to provide dual connections to the bus bar that is remote from the terminal area. The simpliest arrangement is for the extension strips to join the remote bus bar at its ends as shown in FIGS. 2 and 3. However, the invention is not limited to that configuration, and an alternative embodiment is depicted in FIG. 4, where the junctions of the remote bus bar with the extensions are spaced from the ends of the bus bar. This arrangement has the advantage of further avoiding concentration of current at the corner areas of the electroconductive coating. A transparency 40, having the same construction as the embodiments described previously, is provided with a coated area 41 in electrical contact with upper and lower bus bars 42 and 43 respectively. The extension from one side of the upper bus bar 42 to the terminal region includes electroconductive strips 45 and 46, and the extension from the other side of the upper bus bar 42 includes electroconductive strips 47 and 48. Rather than joining the upper bus bar at its very ends, additional extension strips 49 and 50 extend parallel to the upper bus bar and make contact with the upper bus bar at points spaced from the ends thereof. The distance that the junctions are spaced from the ends of the upper bus bar may vary considerably, and the extension strips 49 and 50 could even extend to the center of the bus bar where they could join the bus bar at a common location. The optimum spacing for the sake of evenly distributing the electric current in the coating 41 would be expected to be at approximately one fourth of the total length of the upper bus bar from each end.

In the laminated structure shown in FIG. 1, the bus bar extensions are applied onto the same side of the glass sheet 10 as the bus bars, but other arrangements are within the scope of the present invention wherein the extensions are initially applied onto the plastic innerlayer 11 or the other glass sheet 12. In the latter case, perforations are provided through the innerlayer so that the extensions can make electrical contact with the bus bar by means of a metallic clip, for example. An advantage of locating the extensions on the other side of the innerlayer from the electroconductive coating is that the need to delete marginal portions of the coating is avoided. As another alternative, the bus bars and/or the extensions may take the form of foil strips in any of the embodiments described herein.

This description has been set forth with reference to particular embodiments for the sake of providing the best mode of practicing the invention, but it should be understood that variations and modifications known to those in the art may be resorted to without departing from the scope of the invention as defined by the claims that follow.

I claim:

1. An electrically heated transparency comprising: a transparent sheet, a transparent electroconductive coating on a major surface of the sheet, a first bus bar in contact with the coating along a first edge portion of the sheet, a second bus bar in contact with the coating along a second edge portion of the sheet opposite the first edge portion, at least two electroconductive extensions extending from the second bus bar to at least one terminal area at an edge region removed from the second edge portion, the extensions being electrically insulated from the coating.

2. The transparency of claim 1 wherein the at least one terminal area is located at the first edge portion.

3. The transparency of claim 1 wherein both extensions and the first bus bar are provided with terminal portions closely adjacent to each other in a terminal area at the first edge portion.

4. The transparency of claim 1 wherein the extensions extend from the second bus bar to the at least one terminal area along opposite edge portions of the transparency.

5. The transparency of claim 1 wherein two extensions extend from the second bus bar to the at least one terminal area along a marginal area adjacent to a third edge portion of the transparency.

6. The transparency of claim 5 wherein one of the extensions includes segments extending along at least portions of the first, second and third edge portions of the transparency.

7. The transparency of claim 6 wherein the extensions terminate along the first edge portion.

8. The transparency of claim 1 wherein the extensions join the second bus bar at opposite ends of the bus bar.

9. The transparency of claim 1 wherein the extensions join the second bus bar at locations spaced from the ends of the second bus bar.

10. The transparency of claim 3 wherein the at least one terminal area is in a center portion of the first edge portion.

11. The transparency of claim 1 wherein the transparent sheet is glass.

12. The transparency of claim 11 comprising a lamination of at least one glass sheet and at least one plastic sheet.

13. The transparency of claim 12 wherein the coating and the bus bars are between the glass sheet and a plastic sheet.

14. The transparency of claim 13 wherein the transparency is curved.

15. The transparency of claim 1 wherein the transparent sheet is plastic.

16. The transparency of claim 1 wherein the coating includes silver.

17. The transparency of claim 1 wherein at least one of the extensions joins the second bus bar at a location spaced from an end of the second bus bar.

* * * * *